Patented Feb. 6, 1945

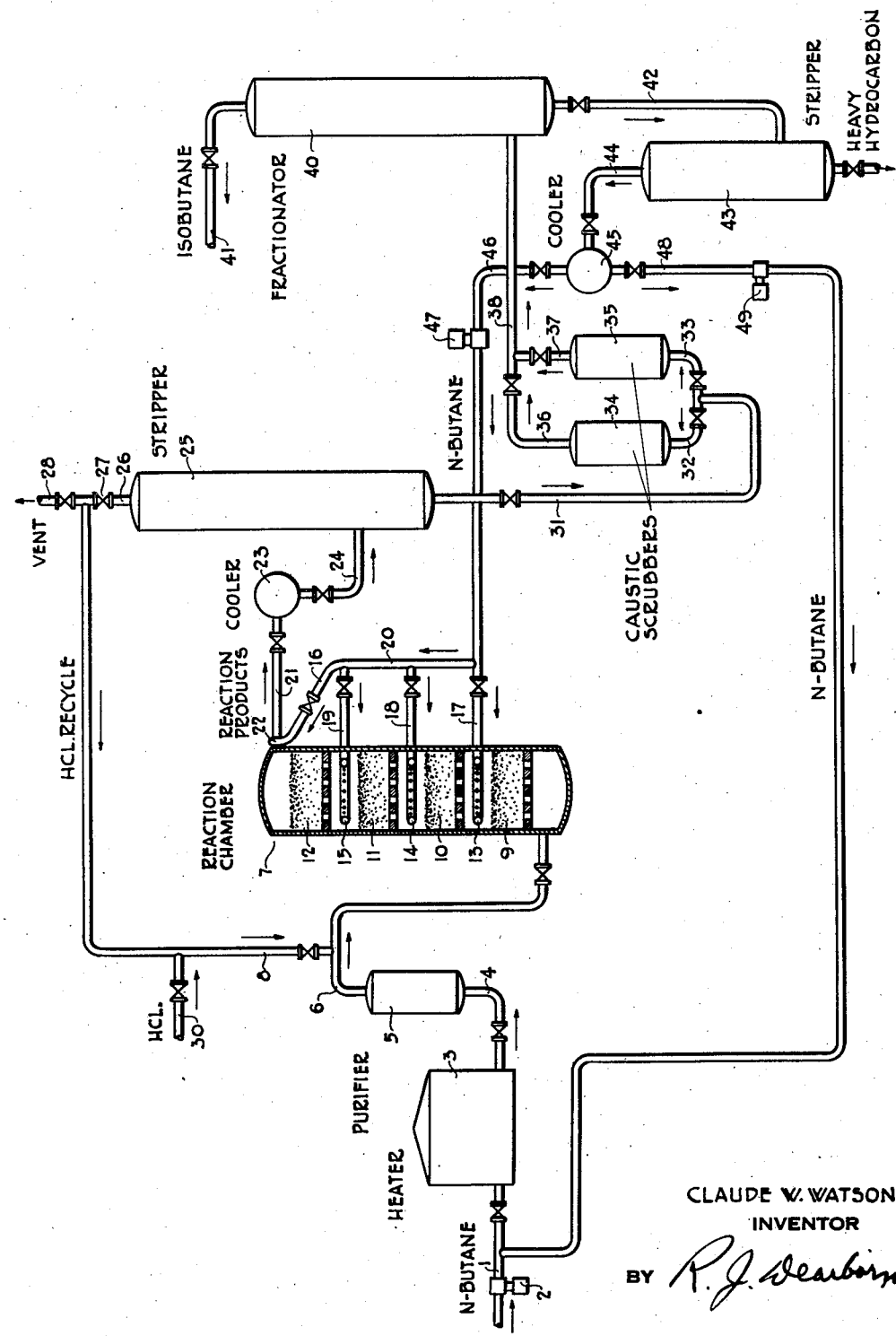

2,368,733

UNITED STATES PATENT OFFICE 2,368,733

ISOMERIZATION OF HYDROCARBONS

Claude W. Watson, Tuckahoe, N. Y., assignor, by mesne assignments, to The Texas Company, New York, N. Y., a corporation of Delaware Application March 29, 1941, Serial No. 385,839

4 Claims. (Cl. 260—683.5)

This invention relates to the conversion of hydrocarbons, especially the isomerization of normal paraffins to isoparaffins. More particularly the invention relates to an improved process for the isomerization of normal butane to isobutane.

It has been proposed to carry out the isomerization of normal paraffins in various ways. For example, it has been proposed to pass the feed hydrocarbons in either the liquid phase or the vapor phase in contact with an isomerization catalyst. As isomerization catalysts it has been proposed to use metallic halides, such as aluminum chloride, aluminum bromide, iron chloride and zirconium chloride, together with a halogen-containing promoter for this type of catalyst such as the hydrogen halides, particularly hydrogen chloride, and alkyl chlorides or other compounds which in the presence of an aluminum halide yield a hydrogen halide. It has also been proposed to use as the catalyst an aluminum halide suspended in an aluminum halide-hydrocarbon complex. Probably the most familiar catalyst of this class is anhydrous aluminum chloride which may be employed in lump form. A valuable catalyst is also one consisting of an adsorbent material, especially an alumina, which may be bauxite or activated alumina, impregnated with aluminum chloride, the impregnation preferably being effected by contacting lump alumina with aluminum chloride in the vapor or liquid phase.

The present invention provides an improvement in the vapor phase isomerization of normal paraffin hydrocarbons, particularly the isomerization of normal butane, which is carried out in the presence of an isomerization catalyst, especially aluminum chloride, that is subject to sublimation at conversion temperatures. When an aluminum chloride catalyst is used, for example, the vaporous reaction products contain sublimed aluminum chloride. The vapors may be substantially saturated with this salt and even slight cooling will result in condensation of the salt. At the reaction temperature the salt possesses activity and tends to cause over-reaction and even coking. Thus, where cooling is permitted the pipes and other equipment would become clogged not only with the deposited salt but also with the products formed by reaction of the salt with the vapors.

In accordance with the invention, the vaporous reaction products at temperatures above the temperature at which the aluminum chloride precipitates, preferably at substantially conversion temperatures, are intimately mixed with an amount of a cool liquid hydrocarbon sufficient to produce a total amount of liquid, including that added and that formed due to condensation, adapted to dissolve the aluminum chloride. It has been recognized in accordance with the invention that although aluminum chloride is only slightly soluble in hydrocarbon oils the relatively small amount contained in the reaction products may be dissolved without the use of an excessive amount of added liquid. The mixture resulting from the addition of the liquid hydrocarbon to the reaction products, which will ordinarily be partly liquid and partly vapor, may be cooled to complete the condensation without difficulties due to precipitation of aluminum chloride. The liquid containing dissolved aluminum chloride is preferably treated to remove this salt by caustic washing, for example, and the resulting salt-free hydrocarbon liquid may then be fractionated for the recovery of the desired products.

The mixing of the reaction products with cool liquid hydrocarbons is preferably carried out immediately upon removing the reaction products from the reaction chamber, or last reaction chamber if more than one has been used, in order to avoid any prior reduction in temperature. The mixing may be carried out by any suitable means adapted to cause intimate contact between liquid and vapor. For example, the vapor pipe for removing the reaction products from the reaction chamber may be encircled with a pipe connected with the interior of the vapor pipe by a number of perforations, the encircling pipe being located approximately at the point the vapor pipe is connected with the reaction chamber. The introduced liquid hydrocarbons would be passed into the encircling pipe and then into the interior of the vapor pipe. Also, the vapor pipe may be provided with a restricted cross section to cause turbulent flow located close to the reaction chamber and the liquid may be injected into the products at this point. Other mixing nozzles and spray means may of course be used.

The liquid hydrocarbon mixed with the vaporous reaction products is advantageously of the same type as that subjected to isomerization. It is preferred to employ for this purpose recycled normal paraffin hydrocarbons, although it is also possible to employ a portion of the feed hydrocarbons in cool liquid condition.

The invention also involves the feature of controlling the temperature during the reaction within selected limits by introducing hydrocarbons at a temperature below the conversion temperature into the hydrocarbon stream passing through the catalyst. The isomerization reaction is an exothermic reaction, and it is often the case that the increase in temperature during the passage of the feed hydrocarbons through the catalyst is of sufficient magnitude to cause over-reaction and conversion beyond the limits selected for efficient operation. By cooling in the manner described, the temperature may be efficiently controlled without the use of complicated equipment or excessive power requirements. The hydrocarbons employed for this purpose are preferably of the same type as those undergoing isomerization, and usually will be recycled normal paraffins obtained by fractionation from the reaction products. The process is carried out with particular facility by disposing the catalyst in a plurality of distinct beds or separate reaction chambers and introducing the cool hydrocarbons into the hydrocarbon stream between these reaction zones.

The improvements described above may be incorporated with advantage in the known isomerization processes, and hence the conditions of operation of the present process are not substantially different from the conditions proposed previously. Thus the temperature may vary from 150° to 250° F. or higher, and the contact time may vary from one to fifteen minutes, a contact time of from one to five minutes generally being preferred. The temperature differential maintained between the inlet and outlet ends of a catalytic reactor by means of the introduction of cool hydrocarbons may vary within wide limits depending upon the type of catalyst employed, construction of the reaction chamber, and other factors. Moreover, in certain cases, it may be desirable to keep the temperature substantially constant during the entire time of contact with the catalyst. It is usually preferred to permit this temperature to rise somewhat during the passage of the hydrocarbons through the catalyst although not sufficiently to cause over-reaction such as cracking and the like. For example, where it is desired to carry out the reaction at a conversion temperature between 210° and 230° F. satisfactory operation can be accomplished by maintaining the inlet temperatures at about 210° F. and the outlet temperature at about 230° F.

Although the pressure may be varied, it is generally preferred to carry out vapor phase operations at pressures not substantially lower than the highest pressure at which the hydrocarbons can exist as vapors at the reaction temperatures.

The drawing discloses a flow diagram illustrating one embodiment of the invention. In the drawing the reaction chamber is shown in section. Inasmuch as the present process is particularly adapted for the isomerization of normal butane to isobutane it will be described in connection with this operation.

Referring to the drawing, normal butane is forced into the system through line 1 by means of pump 2 and passes into heater 3 where it is heated to a conversion temperature and vaporized at the pressure maintained in the system. From the heater the vapors are passed through line 4 leading to a purifier 5 which may contain spent catalyst adapted to remove impurities from the normal butane. The purified normal butane then passes into line 6 leading to the lower portion of reaction chamber 7. During this passage in line 6, there is added to the normal butane a desired amount of promoter through line 8, preferably hydrogen chloride. As shown, the reaction chamber contains four catalyst beds 9, 10, 11 and 12 supported upon foraminous supports. The catalyst is preferably either lump aluminum chloride or consists of lumps of an adsorbent material such as alumina, which may be activated, that has been impregnated with about 17 to 18 per cent by weight of aluminum chloride.

The normal butane containing the promoter passes through catalyst bed 9, then into the vapor space between this bed and catalyst bed 10. Since the isomerization reaction is exothermic in nature, the temperature of the vapor stream is raised by the reaction effected in bed 9. To reduce the resulting temperature to the desired point for contact with catalyst bed 10, cool recycled normal butane is introduced into the vapor stream through an injector 13 which takes the form of a circular perforated pipe. Similar injectors 14 and 15 are disposed in the vapor spaces between the other catalyst beds. Normal butane is led into these injectors through lines 17, 18 and 19 respectively, the latter lines being connected to a line 20 carrying recycled normal butane as will presently be described. As the vapor stream passes through the catalyst beds, the reaction temperature is controlled within the desired limits simply and efficiently by the addition of the cool normal butane. Also, by this means the concentration of normal butane in the vapor stream is raised so that in the later beds a desirable degree of conversion may be effected.

The vaporous reaction products, which will contain sublimed aluminum chloride, leave the reaction chamber through line 21. As shown this line at the point it is connected with the reaction chamber is encircled by a pipe 22. Pipe 22 is connected with the interior of line 21 by a number of perforations. Cool liquid normal butane is introduced into pipe 22 from line 16 and passes through the perforations and into the interior of line 21. The amount of cool liquid normal butane which is intimately mixed with the vaporous reaction products in line 21 is an amount at least sufficient to form a total amount of liquid adapted to dissolve the sublimed aluminum chloride and thereby prevent condensation of this salt. It will be understood that the amount of liquid butane required for addition at this point will depend in large measure upon the type of catalyst used and the conversion temperatures.

The resulting product passes into cooler 23 where the temperature is preferably reduced to 50° to 60° F. and cooling and condensation are completed. The resulting liquid is then passed through line 24 leading to a fractionator or stripper 25. The stripper is operated so as to separate the hydrogen chloride and lighter gases which pass into line 26 controlled by valve 27. A portion of these gases is bled off through line 28 and the remainder is recycled through line 8 to the normal butane passing through line 6. Fresh hydrogen chloride may be introduced into the system through line 30.

From the bottom of stripper 25, liquid products are conducted through lines 31 and 32 or 33 to one of two caustic scrubbers 34 and 35. In the scrubber the aluminum chloride and the remainder of the hydrogen chloride are removed and the products are passed through line 36 or line 37 and line 38 and into fractionator 40. The products are separated into a fraction consisting largely of isobutane and a fraction comprising normal butane and heavier hydrocarbons. The isobutane is removed from the system through line 41, condensed and passed to storage. The latter fraction is removed from the bottom of the fractionator through line 42 and into the stripper or fractionator 43 wherein the heavier hydrocarbons, which are normally formed in small amounts in a conversion reaction, are separated and removed from the normal butane. The normal butane is passed through line 44 and into cooler 45 where it is cooled and preferably liquefied. From the cooler a portion of the butane is recycled through line 46, which is provided with a pump 47. This portion is passed into line 20 and is employed as described above for controlling the reaction temperatures and for preventing condensation of sublimed aluminum chloride. The remainder of the butane is passed into line 48, which is provided with a pump 49, and is returned to inlet line 1 to furnish make-up for the process.

Although it is preferred to operate as described with separate beds of catalyst disposed in a single reaction chamber, the catalyst may also be contained in a single bed, into which the cool normal butane is introduced at spaced points to control the reaction temperature. Also a plurality of separate reaction chambers may be used, in which case the cool normal butane is preferably introduced into the vapor lines between the chambers.

As previously indicated, while it is preferred to use recycled normal paraffin hydrocarbons for controlling the reaction temperature and for preventing condensation of sublimed aluminum chloride, hydrocarbons from other sources may be used. For example, it is contemplated that in certain cases it may be found desirable to employ part of the feed hydrocarbons for this purpose, in these cases, a portion of these hydrocarbons would preferably be by-passed around the heater.

Since changes may be made in the process described above without departing from the scope of the invention, it is intended that the description shall be interpreted as illustrative and not in a limiting sense.

I claim:

1. In a continuous process for isomerizing normal paraffin hydrocarbons in the vapor phase by the action of a solid aluminum halide catalyst in the presence of hydrogen halide, the steps comprising continuously passing a stream of feed hydrocarbon in vapor phase from inlet to outlet through an elongated reaction zone containing a stationary solid mass of the catalyst maintained at a temperature not in excess of about 250° F. such that isomerization constitutes the principal reaction, continuously withdrawing through a discharge conduit from the reaction zone a vapor stream of reacted and unreacted hydrocarbons containing some sublimed aluminum halide, injecting into said effluent vapor stream while at substantially the reaction temperature and at a point substantially immediately adjacent the exit from the reaction zone a stream of liquid hydrocarbon, injecting said liquid hydrocarbon into the vapor stream in amount sufficient to provide sufficient liquid hydrocarbon flowing through said conduit to completely dissolve the aluminum halide contained in the effluent vapors, passing the resulting liquid and vapor mixture through said conduit to a cooling zone wherein remaining hydrocarbon vapors are condensed, chemically treating the cooled liquid to remove the dissolved aluminum halide, passing the treated aluminum halide-free hydrocarbons to a fractionating zone, fractionating the treated hydrocarbons to form a fraction consisting essentially of isomerized hydrocarbons and a liquid fraction comprising unreacted hydrocarbons, recycling a portion of said unreacted hydrocarbon fraction to the vapor discharge conduit to provide said liquid hydrocarbon for injection therein at the exit from the reaction zone, recycling another portion of said unreacted liquid hydrocarbon fraction to the reaction zone, and introducing the hydrocarbons so-recycled to the reaction zone at a plurality of successive points therein intervening between the inlet and outlet of the reaction zone, where the temperature due to exothermic action is above that desired, in order to maintain substantially the same temperature throughout the reaction zone.

2. In a continuous process for isomerizing normal paraffin hydrocarbons in the vapor phase by the action of a solid aluminum halide catalyst in the presence of hydrogen halide, the steps comprising continuously passing a stream of feed hydrocarbon in vapor phase from inlet to outlet through a reaction zone containing a stationary solid mass of the catalyst maintained at a temperature not in excess of about 250° F. such that isomerization constitutes the principal reaction, continuously withdrawing through a discharge conduit from the reaction zone a vapor stream of reacted and unreacted hydrocarbons containing some sublimed aluminum halide and hydrogen halide, injecting into said effluent vapor stream while at substantially the reaction temperature and at a point substantially immediately adjacent the exit from said reaction zone a stream of liquid feed hydrocarbon, injecting said liquid hydrocarbon in amount sufficient to provide sufficient liquid hydrocarbons flowing through said conduit to completely dissolve the aluminum halide contained in the effluent vapor stream, passing the resulting mixture through said conduit to a stripping zone, stripping hydrogen halide from the mixture, chemically treating the cooled mixture to remove the dissolved aluminum halide, passing the treated aluminum halide-free hydrocarbons through a fractionating zone, fractionating the treated hydrocarbons to form a fraction consisting essentially of isomerized hydrocarbons and a fraction comprising unreacted feed hydrocarbon, and recycling said unreacted feed hydrocarbon in liquid phase to the hydrocarbon vapor discharge conduit from said reaction zone.

3. In a continuous process for isomerizing normal butane in the vapor phase by the action of a solid aluminum halide catalyst in the presence of hydrogen halide, the steps comprising continuously passing normal butane in vapor phase from inlet to outlet through a reaction zone containing a stationary solid mass of the catalyst maintained under isomerizing conditions at a temperature in the range of about 150 to 250° F. and such that at least a small amount of aluminum halide is sublimed, continuously withdrawing through a discharge conduit from the reaction zone a vapor stream of isobutane and normal butane containing some aluminum halide, injecting into said effluent vapor stream while at substantially the reaction temperature and at a point substantially immediately adjacent the exit from said reaction zone a stream of cooled liquid normal butane, injecting said liquid butane in amount sufficient to provide liquid hydrocarbon flowing through the conduit sufficient to completely dissolve the aluminum halide contained in the effluent vapor stream, passing the resulting mixture of liquid and vapor through said conduit to a cooling zone wherein remaining hydrocarbon vapors are condensed, chemically treating the cooled liquid to remove the dissolved aluminum halide contained therein, passing the treated aluminum halide-free hydrocarbons to a fractionating zone, fractionating the treated hydrocarbons into a fraction consisting essentially of isobutane and a liquid fraction comprising normal butane, and recycling liquid normal butane to the hydrocarbon vapor discharge conduit from said reaction zone.

4. In a continuous process for isomerizing normal butane in the vapor phase by the action of a solid aluminum halide catalyst in the presence of hydrogen halide, the steps comprising continuously passing normal butane in vapor phase from inlet to outlet through a reaction zone containing a stationary solid mass of the catalyst maintained under isomerizing conditions at a temperature in the range about 150 to 250° F. and such that at least a small amount of aluminum halide is sublimed, continuously withdrawing through a discharge conduit from the reaction zone a vapor stream of isobutane and normal butane containing some aluminum halide and hydrogen halide, injecting into said effluent vapor stream while at substantially the reaction temperature and at a point substantially immediately adjacent the exit from said reaction zone a stream of cooled liquid normal butane, injecting said liquid normal butane in amount sufficient to provide sufficient liquid hydrocarbon flowing through said conduit to completely dissolve aluminum halide contained in the effluent vapor stream, passing the resulting liquid and vapor through said conduit to a cooling zone, stripping hydrogen halide from the cooled mixture, treating the cooled mixture to remove the dissolved aluminum halide, passing the treated aluminum halide-free hydrocarbons to a fractionating zone, fractionating the treated hydrocarbons to form a fraction consisting essentially of isobutane and a fraction comprising normal butane, recycling a portion of said normal butane fraction to the vapor discharge conduit to provide said stream of liquid butane injected to said conduit, recycling another portion of said butane fraction to the reaction zone, and introducing the normal butane fraction so-recycled to the reaction zone at a plurality of successive points therein intervening between the inlet and outlet of the reaction zone, where the temperature due to exothermic action is above that desired, in order to maintain substantially the same temperature throughout the reaction zone.

CLAUDE W. WATSON.